US008463047B2

(12) United States Patent
Chertok et al.

(10) Patent No.: US 8,463,047 B2
(45) Date of Patent: Jun. 11, 2013

(54) EDGE NEIGHBORHOOD DESCRIPTOR

(75) Inventors: Michael Chertok, Petah Tikva (IL); Adi Pinhas, Hod Hasharon (IL); Lev Koushnir, Rehovot (IL)

(73) Assignee: Superfish Ltd., Petah Tikva (IL)

( * ) Notice: Subject to any disclaimer, the term of this patent is extended or adjusted under 35 U.S.C. 154(b) by 67 days.

(21) Appl. No.: 13/054,558

(22) PCT Filed: Jul. 27, 2009

(86) PCT No.: PCT/IL2009/000732
§ 371 (c)(1),
(2), (4) Date: Jun. 9, 2011

(87) PCT Pub. No.: WO2010/013237
PCT Pub. Date: Feb. 4, 2010

(65) Prior Publication Data
US 2011/0235922 A1    Sep. 29, 2011

Related U.S. Application Data

(60) Provisional application No. 61/084,437, filed on Jul. 29, 2008.

(51) Int. Cl.
*G06K 9/48* (2006.01)

(52) U.S. Cl.
USPC .......................................... 382/199; 382/266

(58) Field of Classification Search
None
See application file for complete search history.

(56) References Cited

U.S. PATENT DOCUMENTS

| 4,183,013 A * | 1/1980 | Agrawala et al. | 382/173 |
| 5,640,468 A * | 6/1997 | Hsu | 382/190 |
| 6,151,424 A * | 11/2000 | Hsu | 382/294 |
| 6,282,307 B1 * | 8/2001 | Armato et al. | 382/132 |
| 6,654,483 B1 * | 11/2003 | Bradski | 382/107 |
| 7,039,229 B2 * | 5/2006 | Lin et al. | 382/165 |
| 7,116,825 B2 * | 10/2006 | Lee et al. | 382/226 |
| 7,983,471 B2 * | 7/2011 | Kitamura et al. | 382/145 |
| 8,045,770 B2 * | 10/2011 | Reeves et al. | 382/128 |

OTHER PUBLICATIONS

International Search Report for International Application No. PCT/IL2009/000732 mailed Nov. 17, 2009.
Belongie et al. "Shape Matching and Object Recognition Using Shape Contents." *IEEE.* vol. 24. No. 24. 2002. pp. 509-522.
Gonzalez et al. "Chapter 11: representation and description." *Digital Image Processing.* 2002. pp. 648-649.
Mikolajczyk et al. "A Performance Evaluation of Local Descriptors." *IEEE.* vol. 27. No. 10. 2005. pp. 1615-1630.
Szumilas et al. "Local Structure Detection with Orientation-invariant Radial Configuration." *IEEE.* 2007. pp. 1-7.
Tuytelaars et al. "Matching Widely Separated Views Based on Affine Invariant Regions." *International J. of Computer Vision.* vol. 59. No. 1. 2004. pp. 61-85.

* cited by examiner

*Primary Examiner* — Manav Seth
(74) *Attorney, Agent, or Firm* — Merchant & Gould P.C.

(57) ABSTRACT

System for generating an edge neighborhood descriptor for describing the surrounding of an interest point according to the closest edges includes a sector determiner, a closest edge determiner, and an edge neighborhood descriptor constructor, the closest edge determiner is coupled between the sector determiner and the edge neighborhood descriptor constructor. The sector determiner determines N sectors, surrounding the interest point. The closest edge determiner determines for each of the N sectors, the edge pixel closest to the interest point, according to at least one binary edge map. The edge neighborhood descriptor constructor constructs the edge neighborhood descriptor such that the length of the radius of each of the N sectors is determined according to at least the distance from the interest point to the edge pixel closest to the interest point within the sector, the edge neighborhood descriptor includes the N sectors.

14 Claims, 4 Drawing Sheets

EDGE NEIGHBORHOOD DESCRIPTOR

This application is a National Stage Application of PCT/IL2009/000732, filed 27 Jul. 2009, which claims benefit of U.S. Ser. No. 61/084,437, filed 29 Jul. 2008 and which application are incorporated herein by reference. To the extent appropriate, a claim of priority is made to each of the above disclosed applications.

FIELD OF THE DISCLOSED TECHNIQUE

The disclosed technique relates to image descriptors, in general, and to methods and systems for generating descriptor of a vicinity of an interest point, in a smooth area in the image (i.e., an area with no features and no texture), in particular.

BACKGROUND OF THE DISCLOSED TECHNIQUE

Local image descriptors are descriptors of a portion of an image (e.g., the image portion is the surrounding vicinity of an interest point). Local image descriptors are employed for object recognition (i.e., recognizing an object within the image). A local image descriptor which contains information respective of the object as well as information respective of the background of the object (e.g., the described image portion is partly of the object and partly of the background) is not well suited for object recognition.

Reference is now made to FIG. 1, which is a schematic illustration of an image, generally referenced 50, of a cellular phone and a local polar-rays descriptor for detecting local structures within the image, as known in the art. Image 50 includes a cellular phone 52 and local polar-rays descriptor 62. Cellular phone 52 includes a keypad portion 54, a screen portion 56, a screen 58, and a plurality of keys 60A, 60B, 60C, 60D, 60E, 60F, 60G, 60H, 60I, 60J, 60K, and 60L. Local polar-ray descriptor 62 includes an origin point 64 and a plurality of polar rays 66A, 66B, 66C, and 66D.

Local polar-rays descriptor 62 is in the form of a plurality of rays originating from a single origin point 64 (e.g., a corner interest point). Each of the rays of local polar-rays descriptor 62 ends upon reaching an image area (not shown), having an intensity different than the intensity of origin point 64. Each of the rays of local polar-rays descriptor 62 can go through image edges of image 50, as long as the intensity on both sides of the image edge is similar. Polar ray 66A starts at origin point 64 and stops at the right edge of cellular phone 52 (i.e., the right edge of screen portion 56). Polar ray 66B starts at origin point 64 and stops at the right edge of screen 58. Polar ray 66C starts at origin point 64, goes through the edge separating screen portion 56 and keypad portion 54, and stops at key 60B. Polar ray 66D starts at origin point 64, goes through the edge separating screen portion 56 and keypad portion 54, and stops at key 60C.

An article by Lech Szumilas et al., entitled "Local Structure Detection with Orientation-Invariant Radial Configuration", is directed to a method for generating a local image Orientation-invariant Radial Configuration (ORC) descriptor. The method includes the steps of detecting interest points at local symmetry extrema, extracting the luminance profiles along N radii, yielding one or more boundary-points in each radii, and constructing multiple boundary-points configurations.

The detection of interest points is associated with local symmetry extrema such that the interest points tend to appear in the salient image structure in the image. The second step is extracting the luminance profiles along N radii, positioned at equal radial intervals of $2\pi/N$. The luminance profiles can be replaced or augmented with other profiles, such as color profiles.

The next step is yielding one or more boundary-points along each radius. The boundary-points correspond to transitions between relatively different regions of pixels. Boundary-points detection is repeated for each radius separately. Boundary point detection is different from edge detection by considering only a local image patch and therefore, estimating edge strength relative to local conditions instead of global conditions.

Boundary-points grouping (i.e., boundary point configurations) is based on grouping boundary-points in adjacent radii, exhibiting similar boundary luminance transitions and similar inner luminance spread. An inner luminance spread is the same as the luminance standard deviation along the radius between interest point and boundary point.

An article by Tinne Tuytelaars et al., entitled "Matching Widely Separated Views Based on Affine Invariant Regions", is directed to a method for extracting invariant regions in an image for matching image patches of two wide-baseline stereo images. The method includes the steps of locating a local extrema of intensity, determining an intensity function along each of a plurality of rays emanating from the local extrema, determining a maximum point for each of these intensity functions, linking all the maximum points for enclosing an image region, fitting an ellipse to the enclosed region, and doubling the size of the ellipse.

The energy function is given by the following formula:

$$f_l(t) = \frac{\text{abs}(l(t) - l_0)}{\max\left(\frac{\int_0^t \text{abs}(l(t) - l_0) dt}{t}, d\right)}$$

t—the Euclidean arc length along a ray
$l_0$—the local extrema
$l(t)$—the intensity at position t The enclosing ellipse has similar shape moments (i.e., up to the second order) as those of the enclosed region. The double sized ellipse defines a more distinctive image region due to a more diversified texture pattern within the area of the ellipse.

An article by Serge Belongie et al., entitled "Shape Matching and Object Recognition Using Shape Contexts", is directed to a method for matching objects according to their shape. This article describes a new shape context descriptor. An object is presented as a discrete set of points sampled from the internal or external contours of the object. The contours of the object are detected by an edge detector.

The shape context descriptor is constructed by defining a set of vectors originating from a single point of the discrete set (i.e., a reference point) to all other points of the discrete set. In order to make the shape context descriptor more robust, the following steps are executed. Computing a histogram of the relative coordinates (i.e., based on the set of vectors) of the remaining points of the discrete set. Defining a plurality of sets of bins spread uniformly in log-polar space. Making the descriptor more sensitive to positions of nearby sample points (i.e., points of the discrete set) according to the bin each of the points is located at. In other words, points of the discrete set located in a bin closer to the reference point are given a higher value.

SUMMARY OF THE PRESENT DISCLOSED TECHNIQUE

It is an object of the disclosed technique to provide a novel system and method for generating an edge neighborhood local image descriptor, which overcomes the disadvantages of the prior art. In accordance with the disclosed technique, there is thus provided a system for generating an edge neighborhood descriptor for describing the surrounding of an interest point according to the closest edges. The system includes a sector determiner, a closest edge determiner, and an edge neighborhood descriptor constructor. The closest edge determiner is coupled between the sector determiner and the edge neighborhood descriptor constructor. The sector determiner determines N sectors, surrounding the interest point. The closest edge determiner determines for each of the N sectors, the edge pixel closest to the interest point, according to at least one binary edge map. The edge neighborhood descriptor constructor constructs the edge neighborhood descriptor such that the length of the radius of each of the N sectors is determined according to at least the distance from the interest point to the edge pixel closest to the interest point within the sector. The edge neighborhood descriptor includes the N sectors.

In accordance with another embodiment of the disclosed technique, there is thus provided a method for generating an edge neighborhood descriptor for describing the surrounding of an interest point according to the closest edges. The method includes the procedures of dividing the surrounding of the interest point into N sectors, for each of the N sectors, determining the closest edge pixel to the interest point according to at least one binary edge map, and constructing the edge neighborhood descriptor. The procedure of constructing is performed such that the length of the radius of each of the N sectors is determined according to at least the respective one of an N distances from the closest edge pixel in each of the N sectors to the interest point.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by detecting an interest point in an image, detecting edges in the image, dividing the neighborhood of the detected interest point into N sectors, determining the closest edge to the interest point within each of the N sectors, normalizing the distance from the interest point to each of the closest edges according to a normalization marker, and orienting the distances to each of the closest edges according to an orientation marker. The Edge Neighborhood Descriptor (END) can describe an image portion containing no features and no texture (i.e., shape based descriptor). The END contains information of either the object in the image or the background of the image.

Figure 1:
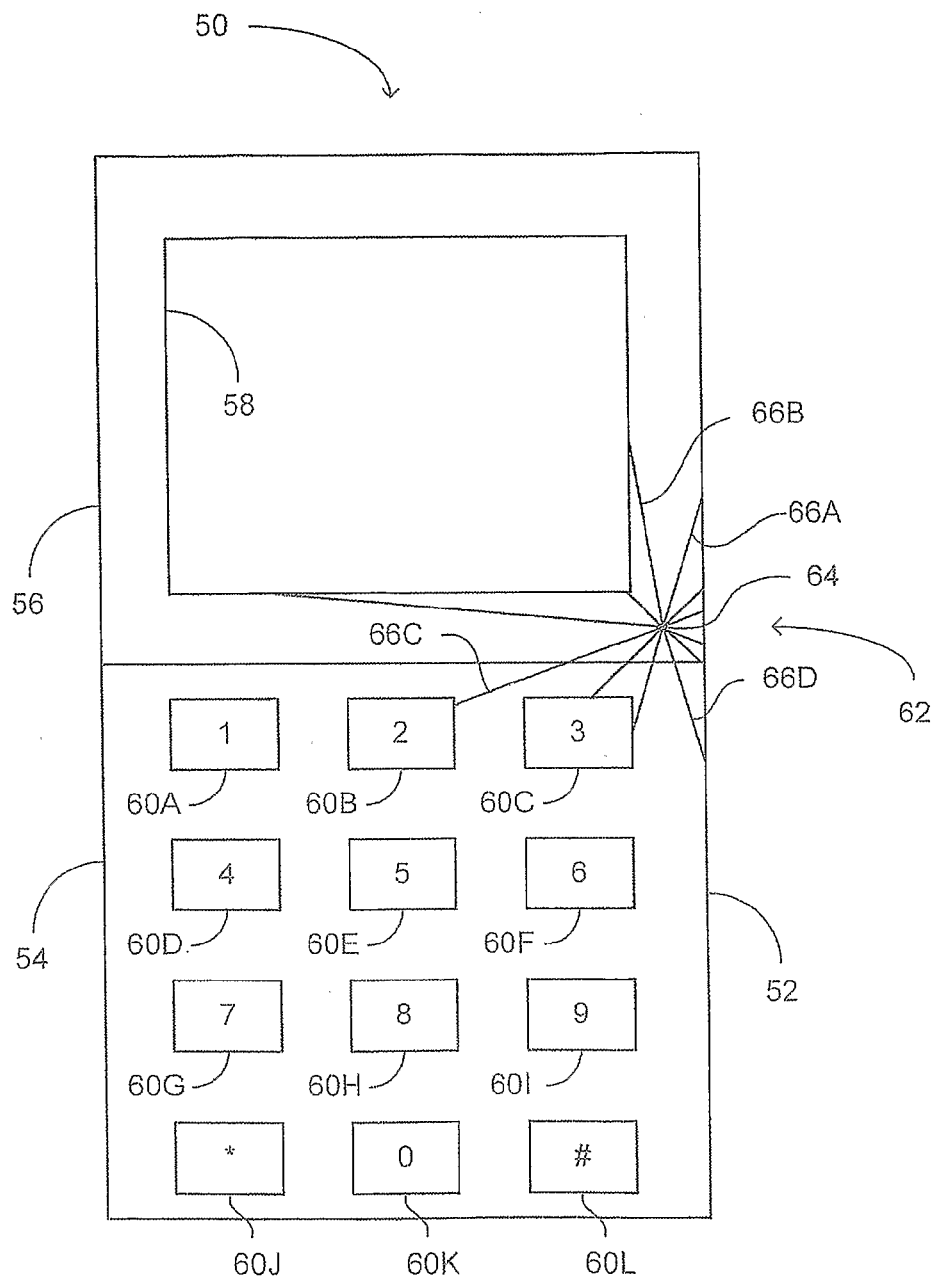
FIG. 1, is a schematic illustration of an image of a cellular phone and a local polar-rays descriptor for detecting local structures within the image, as known in the art.
Figure 2:
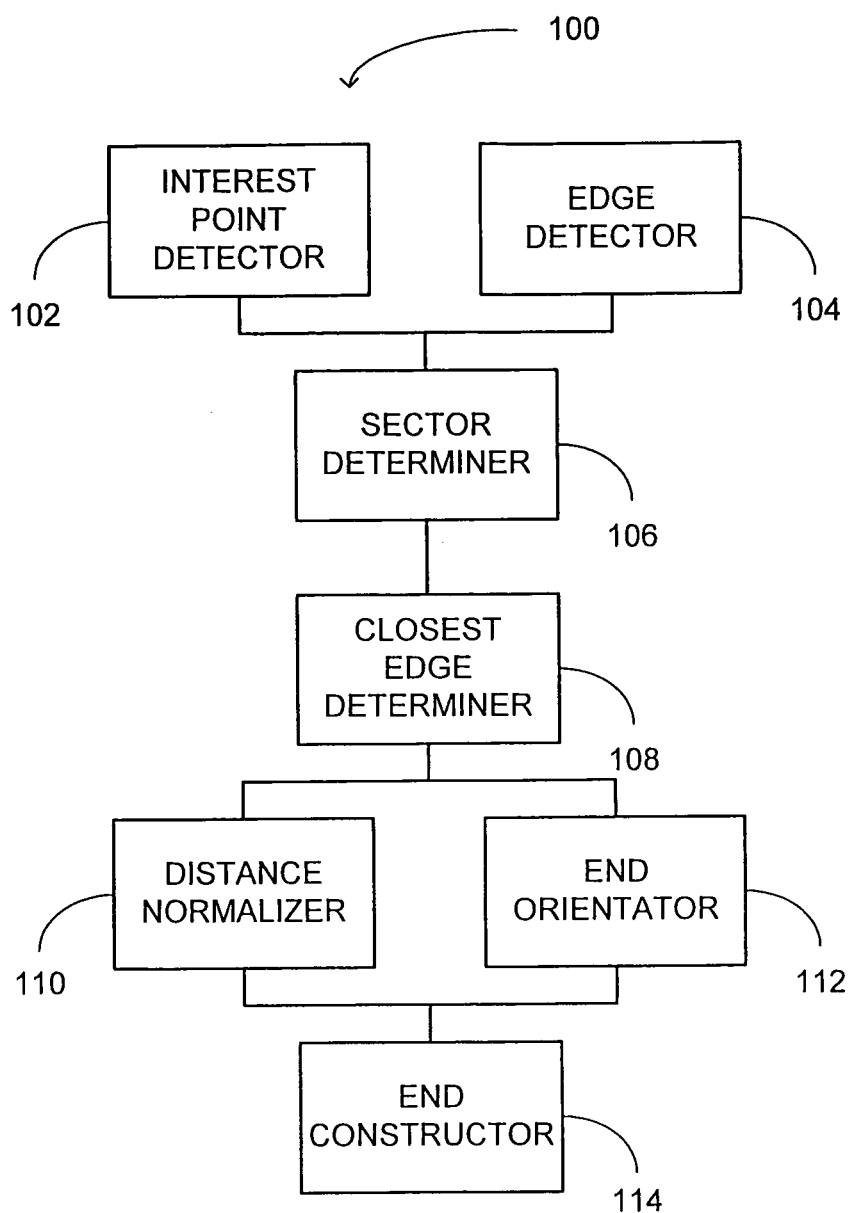
FIG. 2, is a schematic illustration of a system for generating an Edge Neighborhood Descriptor (END), constructed and operative in accordance with an embodiment of the disclosed technique.

Reference is now made to FIG. 2, which is a schematic illustration of a system, generally referenced 100, for generating an Edge Neighborhood Descriptor (END), constructed and operative in accordance with an embodiment of the disclosed technique. System 100 includes an interest point detector 102, an edge detector 104, a sector determiner 106, a closest edge determiner 108, a distance normalizer 110, an END orientator 112, and an END constructor 114. Sector determiner 106 is coupled with interest point detector 102, edge detector 104, and with closest edge determiner 108. Closest edge determiner 108 is coupled with distance normalizer 110 and with END orientator 112. END constructor 114 is coupled with distance normalizer 110 and with END orientator 112.

Interest point detector 102 can be any interest point detector known in the art, such as a Harris operator detector, Laplacian of Gaussian detector, difference of Gaussian detector, and the like. Interest point detector 102 receives an image of an object (e.g., image 150—FIG. 3 of a screen portion 158—an object). Interest point detector 102 detects interest points within the image of the object. At least one of the detected interest points is inside the object. Interest point detector 102 provides the at least one interest point, detected inside the object, to sector determiner 106.

Edge detector 104 can be any edge detector as known in the art, such as Canny edge detector, Sobel edge detector, and the like. Edge detector 104 receives the image of the object. Edge detector 104 detects a plurality of edges within the image of the object. Edge detector 104 constructs a binary edge map (i.e., each pixel in the binary edge map is either an edge pixel—edgel—or a non-edge pixel) according to the detected edges. It is noted that, more than one edge detector can be employed for generating more than one binary edge map in order to increase the robustness of system 100 to edge detection errors. It is further noted that, each edge-detector can generate several maps, using different parameters. An END is constructed for each of the binary edge maps, which is appropriate as determined according to the application the END is employed for. Edge detector 104 provides the constructed binary edge map to sector determiner 106.

Sector determiner 106 receives the detected interest points from interest point detector 102 and receives the binary edge map from edge detector 104. Sector determiner 106 sets the at least one detected interest point as a seed point for the construction of an END. Sector determiner 106 divides an area surrounding the seed point into N equal sectors. Each of the N sectors conforms to a radial angle of $2\pi/N$ radians. The Number of the sectors N is determined according to image properties (e.g., resolution), application, system constrains, trials and errors for achieving the best results, and the like. Alternatively, sector determiner 106 divides the area surrounding the seed point into N sectors. The central angle of at least one of the N sectors is different from the central angle of at least another one of the N sectors (i.e., non-equal sectors). The sector sizes (i.e., the central angle of each of the sectors) are determined according to image properties (e.g., resolution), application, system constrains, trials and errors for achieving the best results, and the like.

Closest edge determiner 108 receives the at least one END seed point and the binary edge map from sector determiner 106. Closest edge determiner 108 determines, for each of the N sectors, the edgel closest to the seed point (i.e., the edge pixel in the binary edge map which is located at the shortest distance from the seed point of the END). Closest edge determiner 108 sends the END seed point, the N radial sectors, and the distance to the closest edgel for each of the N sectors, to distance normalizer 110.

Distance normalizer 110 receives the END seed point, the N radial sectors, and the distance to the closest edgel for each of the N sectors from closest edge determiner 108. Distance normalizer 110 determines the longest one of the N distances, and defines the longest distance as a normalization marker. Distance normalizer 110 sets the value of the length of the normalization marker as one. Distance normalizer 110 normalizes the value of the length of each of the remaining distances (i.e., the N distances excluding the normalization marker for a total of N-1 distances) according to the normalization marker. For example, the longest distance is 14 pixels and the second longest distance is 7 pixels. Distance normalizer 110 sets the value of the length of the longest distance (i.e., normalization marker) as one and sets the value of the length of the second longest distance as 7/14 (0.5). Alternatively, distance normalizer 110 defines the shortest of the N distances as the normalization marker.

END orientator 112 receives the END seed point, the N radial sectors, and the distance to the closest edgel for each of the N sectors from closest edge determiner 108. END orientator 112 determines the longest one of the N normalized distances, and defines the longest distance as an orientation marker. END orientator 112 sets the orientation of the END according to the orientation of the orientation marker (i.e., the sector in which the distance between the END seed point and the closest edgel is the greatest). Alternatively, END orientator defines the shortest of the N distances (i.e., the distance to the closest edgel in each of the N sectors) as the orientation marker.

END constructor 114 receives the End seed point, the N sectors including the N distances to the closest edgel, the normalized N distances and the orientation of the orientation marker. END constructor 114 constructs the Edge Neighborhood Descriptor (END). The length of the radius of each of the N sectors is equal to respective distance from END seed point to the closest edgel in that sector. Alternatively, the length of the radius of each of the N sectors is determined according to respective distance from END seed point to the closest edgel in that sector (i.e., the length of the radius of a specific one of the N sectors is a function of at least the respective distance from END seed point to the closest edgel in that sector). The END of the seed point can be employed for object recognition, and the like.

It is noted that, in case the END seed point is inside the object, the entire END (i.e., the N sectors) is inside the object. And in case the END seed point is in the background, the END is in the background. It is further noted that, END can describe image portions with smooth intensity and poor texture content. In other words, image portions with substantially homogenous intensity and smooth texture. Additionally, END describes the shape of an image portion even when the image portion is enclosed by a partial boundary (i.e., each sector stops upon reaching an edgel even when the edgel is a part of a partial boundary).

Figure 3:
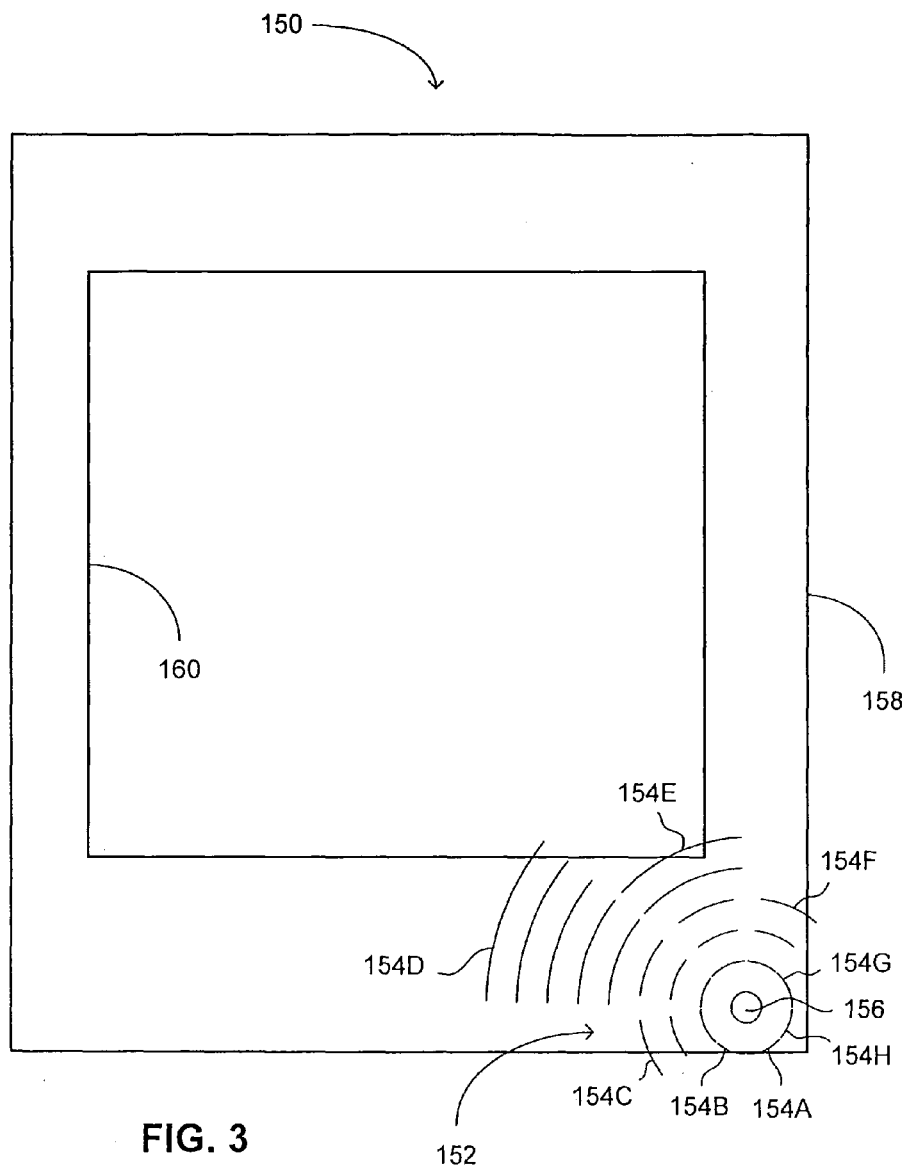
FIG. 3, is a schematic illustration of an image of a screen portion of a cellular phone and an Edge Neighborhood Descriptor (END), constructed and operative in accordance with another embodiment of the disclosed technique.

Reference is now made to FIG. 3, which is a schematic illustration of an image, generally referenced 150, of a screen portion of a cellular phone and an Edge Neighborhood Descriptor (END), constructed and operative according to another embodiment of the disclosed technique. Image 150 includes a screen portion 158 and an END 152. Screen portion 158 includes a screen 160. END 152 includes eight radial sectors 154A, 154B, 154C, 154D, 154E, 154F, 154G, and 154H, and a seed point 156. END 152 is constructed by an END constructing system (e.g., system 100 of FIG. 2).

It is noted that, screen portion 158 lacks texture and is simply a white rectangle (i.e., screen 160) inside a gray rectangle (screen portion 158). END 152 describes the vicinity of seed point 156 inside screen portion 158 according to the shape of the surrounding of seed point 156. END 152 determines the shape of the surrounding of seed point 156 according to the edges surrounding seed point 156. END 152 describes only image portions whose edges are closest to seed point 156 (i.e., END 152 describes only image portions, and image shapes, which are located within the object).

Figure 4:
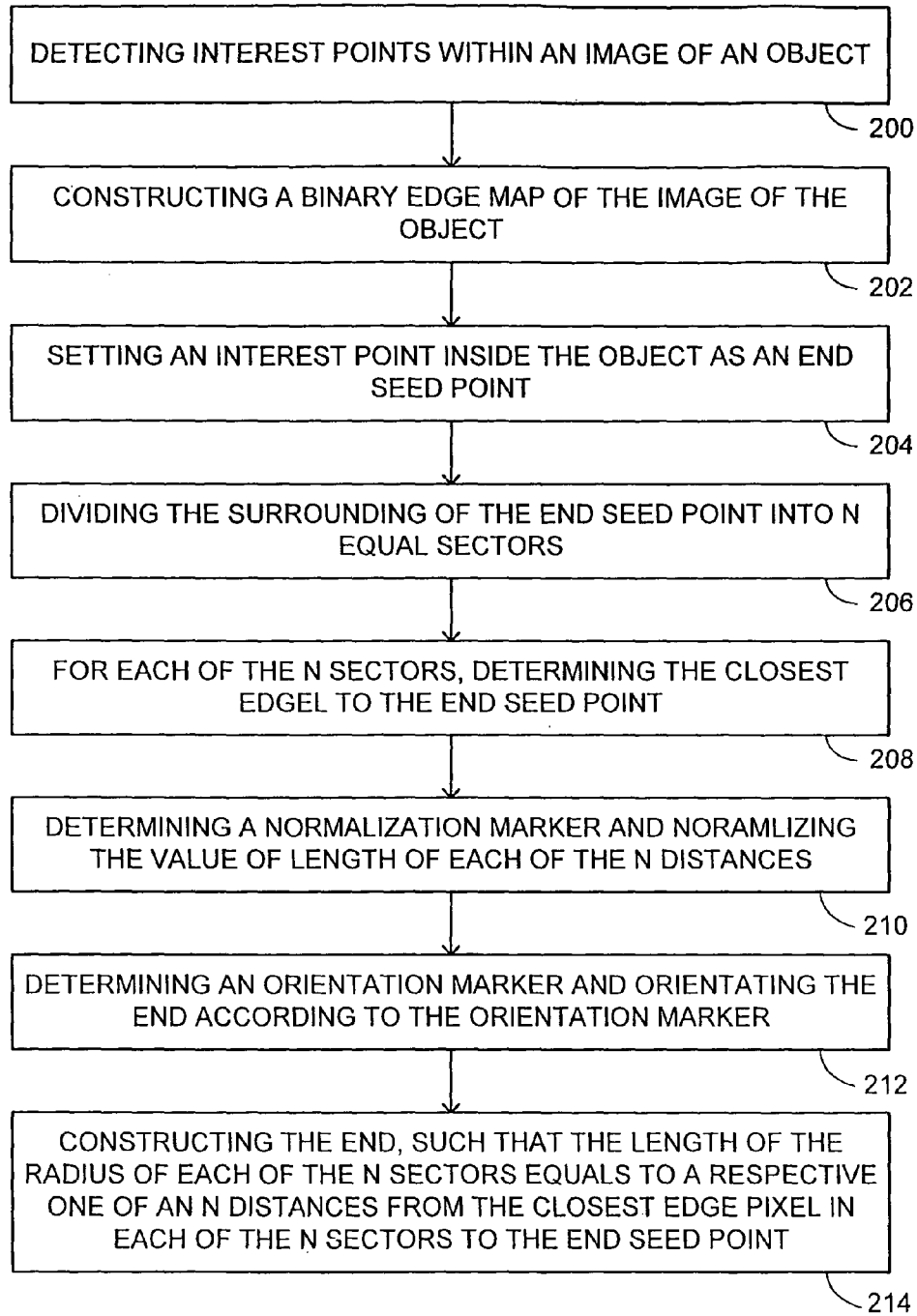
FIG. 4, is a schematic illustration of a method for generating an END of an image portion surrounding a seed point, operative in accordance with a further embodiment of the disclosed technique.

Reference is now made to FIG. 4, which is a schematic illustration of a method for generating an END of an image portion surrounding a seed point, operative in accordance with a further embodiment of the disclosed technique. In procedure 200, interest points are detected within an image of an object. With reference to FIGS. 2 and 3, interest point detector 102 detects at least one interest point inside screen portion 158 (i.e., the object) of image 150 (i.e., the image).

In procedure 202, a binary edge map of the image of the object is constructed. With reference to FIGS. 2 and 3, edge detector 104 detects the edges of image 150. Edge detector 104 further constructs a binary edge map of image 150 according to the detected edges. It is noted that, a plurality of edge detectors can be employed for generating a plurality of binary edge maps in order to increase the robust to edge detection errors. An END is constructed for each of the binary edge maps. It is further noted that, multi-maps can be created from a single edge-detector (i.e., by employing different edge detector parameters).

In procedure 204, an interest point inside the object (i.e., inside the shaped which is described by the END) is set as an END seed point. With reference to FIGS. 2 and 3, sector determiner 106 sets seed point 156 as an END seed point. Seed point 156 was detected by interest point detector 102 (e.g., interest point detector 102 is a Harris corner detector which detected seed point 156 as representing the bottom right corner of screen portion 158).

In procedure 206, the surrounding of the seed point is divided into N equal sectors. Each of the N equal sectors conforms to a radial angle of $2\pi/N$ radians. With reference to FIGS. 2 and 3, sector determiner 106 divides the surrounding of END seed point 156 into N equal sectors 154A to 154H. Alternatively, the surrounding of the seed point is divided into N non-equal sectors. The central radial angle of at least one of the N sectors is different from the central radial angle of at least another one of the N sectors (i.e., non-equal sectors). The sector sizes (i.e., the central radial angle of each of the sectors) are determined according to image properties (e.g., resolution), application, system constrains, trials and errors for achieving the best results, and the like.

In procedure 208, for each of the N sectors, the closest edgel to the end seed point is determined. With reference to FIGS. 2 and 3, closest edge determiner 108 determines the closest edgel to seed point 156 in each of the eight sectors 154A to 154H. Closest edge determiner 108 determines the distance from seed point 156 to each of the closest edgels.

In procedure 210, a normalization marker is determined and the value of length of each of the N distances (i.e., the distance from the END seed point to the closest edgel in each of the N sectors) is normalized according to the length of the normalization marker. With reference to FIGS. 2 and 3, distance normalizer 110 determines the normalization marker from the eight distances from seed point 156 to the closest edgel in each of the eight sectors 154A to 154H. Distance normalizer 110, sets the values of the length of the normalization marker (i.e., the length of sector 154D) as one. Distance normalizer 110 normalizes the distances between seed point 156 and the closest edgel in each of sectors 154A, 154B, 154C, 154E, 154F, 154G, and 154H according to the distance between seed point 156 and the closest edgel in sector 154D (i.e., the distance of the normalization marker).

In procedure 212, an orientation marker is determined and the END is orientated according to the orientation marker. With reference to FIGS. 2 and 3, END orientator 112 determines the orientation marker from the eight distances from seed point 156 to the closest edgel in each of the eight sectors 154A to 154H. END orientator 112 sets the orientation of the END as the direction of sector 154D (i.e., the longest sector which was defined as the orientation marker). In other words, the radial angle between the orientation of END 152 and orientation marker 154D is zero radians.

In procedure 214, the END is constructed, such that the length of the radius of each of the N sectors equals to a respective one of an N distances from the closest edge pixel in each of the N sectors to the end seed point. With reference to FIGS. 2 and 3, END 152 is constructed by END constructor 114 such that the radius of each of sectors 154A, 154B, 154C, 154D, 154E, 154F, 154G, and 154H, equals to a respective distance from seed point 156 to the closest edge pixel in that sector. Alternatively, the END is constructed, such that the length of the radius of each of the N sectors is determined according to the respective distance from END seed point to the closest edgel in that sector (i.e., the length of the radius of a specific one of the N sectors is a function of at least the respective distance from END seed point to the closest edgel in that sector).

It is noted that, procedures 200 and 202 can be exchanged (i.e., procedure 202 is performed before procedure 200). Alternatively, procedures 200 and 202 are performed simultaneously. It is further noted that, the END (e.g., END 152 of FIG. 3) is scale invariant and rotation invariant (i.e., the END is normalized and oriented according to a normalization marker and an orientation marker, respectively). For the purpose of object recognition, a combination of texture based descriptors (e.g., LBP) and shape based descriptors (e.g., END) can be employed for different image portions. In other words, the texture based descriptor is employed in image areas with rich texture and the shape based descriptor is employed in image areas with little texture (i.e., smooth image areas).

It will be appreciated by persons skilled in the art that the disclosed technique is not limited to what has been particularly shown and described hereinabove. Rather the scope of the disclosed technique is defined only by the claims, which follow.

The invention claimed is:

1. An object descriptor computer system for generating an edge neighborhood descriptor for describing the surrounding of an interest point within an object portion of an image of an object according to the closest edges to the interest point, the system comprising:
a memory;
a processor coupled with the memory, the processor executing instructions stored on the memory for implementing the following modules:
a sector determiner receiving said image and receiving data respective of the location of the interest point within the object portion of the image from an interest point detector, the sector determiner setting the interest point as a seed point for the edge neighborhood descriptor, the sector determiner dividing the image into N radial sectors projecting from the interest point;
a closest edge determiner, coupled with said sector determiner, the closest edge determiner receiving at least one binary edge map of the image from an edge detector, said closest edge detector determining for each of said N sectors, the edge pixel closest to said interest point, according to at the least one binary edge map of the image;
an edge neighborhood descriptor constructor coupled with said closest edge determiner, the descriptor constructor constructing said edge neighborhood descriptor such that the length of the radius of each of said N sectors is determined according to the distance from said interest point to the edge pixel closest to said interest point within said sector, wherein said edge neighborhood descriptor includes said N sectors;
wherein the system employs the edge neighborhood descriptor for characterizing the object portion of the image, which surrounds the interest point, for recognizing an object within the image.

2. The system of claim 1, further comprising an interest point detector coupled with said sector determiner, said interest point detector receiving an image of an object and detecting said interest point within said image.

3. The system of claim 1, further comprising an edge detector coupled with said sector determiner, said edge detector receiving an image of an object and producing said at least one binary edge map.

4. The system of claim 1, wherein said sector determiner determines N equal sectors, the radial angle of each of said equal sectors conforming to an angle of $2\pi$ IN.

5. The system of claim 1, wherein said sector determiner determines N sectors, the radial angle of at least one of said sectors conforms to a different angle than the radial angle of at least another one of said sectors.

6. The system according to claim 1, further comprising a distance normalizer coupled with said closest edge determiner and with said edge neighborhood descriptor constructor, said distance normalizer determines the length of the radius of a selected one of said sectors as a normalization marker, said distance normalizer normalizing the length of the radius of each of said N sectors according to said normalization marker.

7. The system according to claim 1, further comprising an edge neighborhood descriptor orientator coupled with said closest edge determiner and with said edge neighborhood descriptor constructor, said edge neighborhood descriptor orientator determining the orientation of a selected one of said sectors as an orientation marker, said edge neighborhood descriptor orientator orientating said edge neighborhood descriptor according to said orientation marker.

8. An object descriptor method for generating an edge neighborhood descriptor for describing the surrounding of an interest point within an object portion of an image of an object according to the closest edges, the method comprising the procedures of:
setting the interest point as a seed point for the edge neighborhood descriptor;
dividing said image into N sectors projecting from the interest point by a sector determiner module of an object descriptor computer system;
for each of said N sectors, determining the closest edge pixel to said interest point according to at least one binary edge map of said image by a closest edge determiner of the object descriptor system; and
constructing by a descriptor constructor of the object descriptor system, said edge neighborhood descriptor such that the length of the radius of each of said N sectors is determined according to at least the respective one of an N distance from the closest edge pixel in each of said N sectors to said interest point.

9. The method of claim 8, further comprising the procedure of detecting said interest point within an image of an object, performed prior to said procedure of dividing.

10. The method of claim 8, further comprising the procedure of constructing said at least one binary edge map, performed prior to said procedure of dividing.

11. The method of claim 8, wherein said N sectors are equal, the radial angle of each of said equal sectors conforming to an angle of $2\pi/N$.

12. The method of claim 8, wherein the radial angle of at least one of said N sectors conforms to a different angle that the radial angle of at least another one of said N sectors.

13. The method according to claim 8, further comprising the procedures of:
determining a normalization marker according to the length of a selected one of said N sectors, and normalizing the values of lengths of each of said N sectors according to said normalization marker.

14. The method according to claim 8, further comprising the procedures of: determining an orientation marker according to the orientation of a selected one of said N sectors, and orientating said edge neighborhood descriptor according to said normalization marker.

* * * * *